United States Patent
Watanabe et al.

(10) Patent No.: US 7,066,855 B2
(45) Date of Patent: Jun. 27, 2006

(54) LINE PRESSURE CONTROL APPARATUS FOR CONTINUOUSLY VARIABLE TRANSMISSION

(75) Inventors: Shinichiro Watanabe, Fuji (JP); Makoto Sawada, Fuji (JP); Takanori Aoki, Fuji (JP); Ryousuke Nonomura, Fuji (JP)

(73) Assignee: Jatco LTD (JP)

( * ) Notice: Subject to any disclaimer, the term of this patent is extended or adjusted under 35 U.S.C. 154(b) by 260 days.

(21) Appl. No.: 10/647,906

(22) Filed: Aug. 25, 2003

(65) Prior Publication Data

US 2004/0092344 A1    May 13, 2004

(30) Foreign Application Priority Data

Aug. 27, 2002 (JP) ............................ 2002-246423

(51) Int. Cl.
*F16H 61/06* (2006.01)

(52) U.S. Cl. .......................................... 474/18; 474/28
(58) Field of Classification Search ................ 474/18, 474/28, 19, 46; 477/45–48, 155–160
See application file for complete search history.

(56) References Cited

U.S. PATENT DOCUMENTS

| | | | |
|---|---|---|---|
| 5,107,723 A | 4/1992 | Yamashita et al. ............. 74/866 |
| 5,871,416 A | 2/1999 | Sawada et al. ................ 477/47 |
| 5,941,786 A * | 8/1999 | Van Wijk et al. .............. 474/18 |
| 6,120,413 A * | 9/2000 | Kawamura ..................... 477/50 |
| 6,168,547 B1 | 1/2001 | Kawamura .................... 477/156 |
| 6,217,469 B1* | 4/2001 | Sawada et al. ............... 474/28 |

FOREIGN PATENT DOCUMENTS

| JP | (62-83548 A * | 4/1987 | .................... 474/28 |
|---|---|---|---|
| JP | (11-166620 A * | 6/1999 | |

* cited by examiner

*Primary Examiner*—Marcus Charles
(74) *Attorney, Agent, or Firm*—Rossi, Kimms & McDowell LLP

(57) ABSTRACT

There is provided a line pressure control apparatus that is comprised of a line pressure control section that controls line pressure according to its target value calculated based on input torque information, target gear ratio, and so forth; and a line pressure setting section that sets the upper limit of the line pressure according to an inputted range signal when the engine speed is equal to or higher than a predetermined speed. The line pressure control section suppresses an increase in line pressure by controlling the line pressure such that it does not exceed the set upper limit in the case where the upper limit of the line pressure has been set. Therefore, it is possible to prevent the occurrence of cavitation noise in an oil pump, which generates basic pressure for line pressure, during high-speed engine revolution.

5 Claims, 3 Drawing Sheets

LINE PRESSURE CONTROL APPARATUS FOR CONTINUOUSLY VARIABLE TRANSMISSION

BACKGROUND OF THE INVENTION

1. Field of the Invention

The present invention relates to a line pressure control apparatus for a V-belt type continuously variable transmission, which regulates the upper limit of line pressure during high-speed engine revolution.

2. Description of the Prior Art

Conventionally, a V-belt type continuously variable transmission (hereinafter referred to as "belt CVT") provided in a vehicle is constructed such that a primary pulley and a secondary pulley whose groove widths are variably controlled according to oil pressure support a V belt by sandwiching it, and power is transmitted by contact frictional force of the V belt.

An example of the belt CVT has been disclosed in Japanese Laid-Open Patent Publication No. 11-37237. In the belt CVT disclosed in this publication, the thrust of pulleys is found based on the input torque and the gear ratio, and it is converted to oil pressure value according to predetermined values indicative of the pressure receiving areas of the secondary pulley and the primary pulley, or the like, and the oil pressure value is supplied as target line pressure to a transmission mechanism.

As the transmission mechanism, a mechanical feedback mechanism and a gear ratio control mechanism have been disclosed which cause a step motor to open a shift control valve according to the target gear ratio, and cause a servo link, to which the primary pulley is connected, to close the shift control valve according to the groove width of the primary pulley to finish changing gears when the groove width of the primary pulley reaches a value corresponding to the target gear ratio.

Further, in the belt CVT a line pressure is generated by regulating an oil pressure supplied from an oil pump. The line pressure is supplied to the secondary pulley, and a primary pressure obtained by regulating the line pressure is supplied to the primary pulley via the shift control valve.

The above described conventional belt CVT, however, has the problem that cavitation noise occurs in the oil pump, which generates line pressure for use in the continuously variable transmission, during high-speed engine revolution.

SUMMARY OF THE INVENTION

It is therefore an object of the present invention to provide a line pressure control apparatus for a V-belt type continuously variable transmission, which is capable of preventing the occurrence of cavitation noise in an oil pump during high-speed engine revolution.

To attain the above object, there is provided a line pressure control apparatus for a V-belt type continuously variable transmission, including engine speed detecting means for detecting an engine speed; a line pressure upper limit setting means for setting an upper limit of the line pressure; and a line pressure control means for controlling the line pressure according to a running condition; and wherein the line pressure upper limit setting means is operable when the engine speed detected by the engine speed detecting means is equal to or higher than a predetermined speed, for setting the upper limit of the line pressure; and the line pressure control means controls the line pressure such that the line pressure does not exceed the upper limit set by the line pressure upper limit setting means.

With the above arrangement, when the engine speed is equal to or higher than a predetermined speed, i.e., during high-speed engine revolution, the upper limit of the line pressure is set, so that the line pressure control means restricts an increase in the line pressure. Therefore, it is possible to prevent the occurrence of cavitation noise in an oil pump which generates basic pressure for the line pressure.

The above and other objects, features, and advantages of the invention will become more apparent from the following detailed description taken in conjunction with the accompanying drawings.

DETAILED DESCRIPTION OF THE PREFERRED EMBODIMENT

The present invention will now be described in detail with reference to the drawings showing a preferred embodiment thereof.

Figure 1:
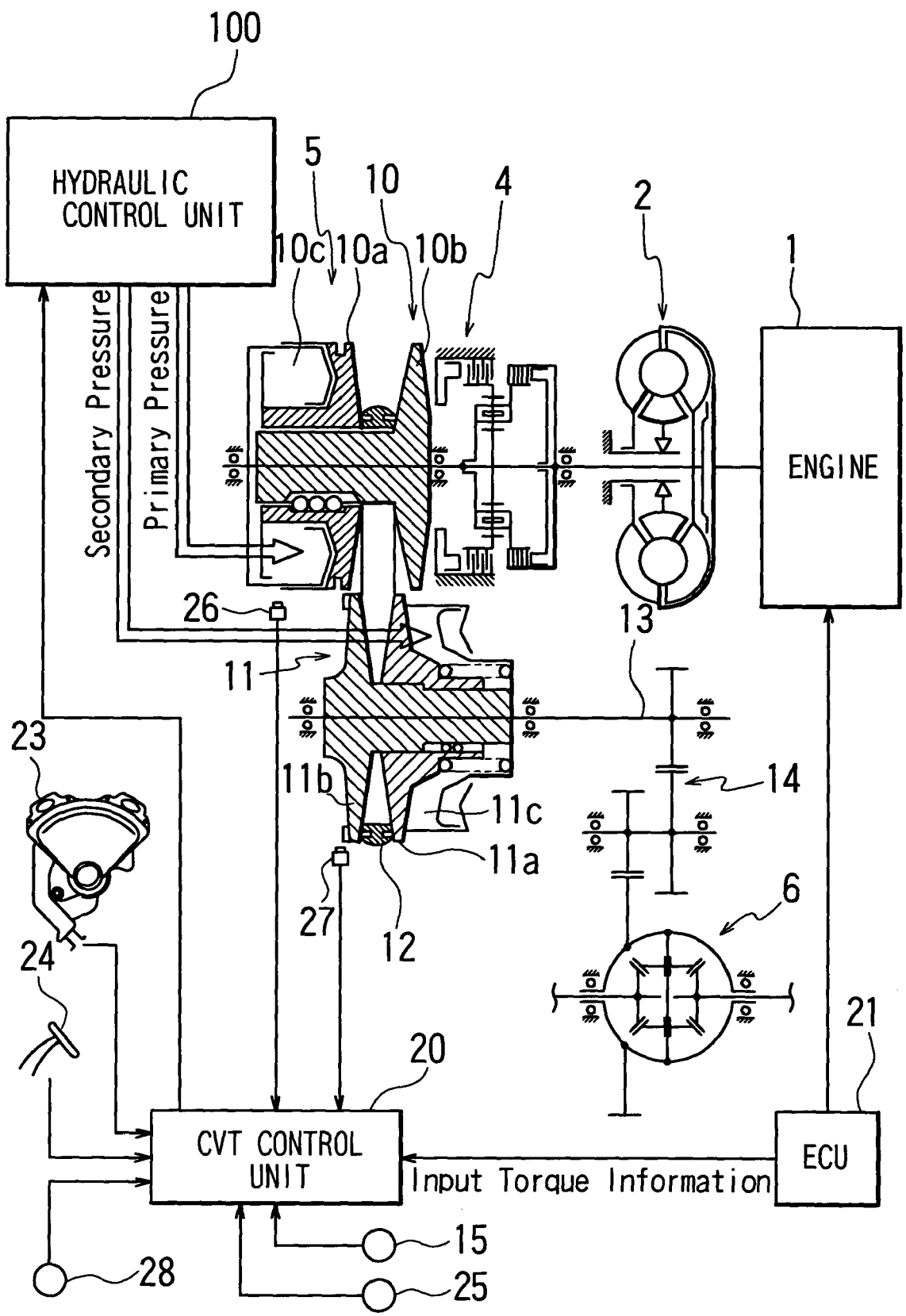
FIG. 1 is a diagram showing the construction of a line pressure control apparatus for a continuously variable transmission according to an embodiment of the present invention.
Figure 2:
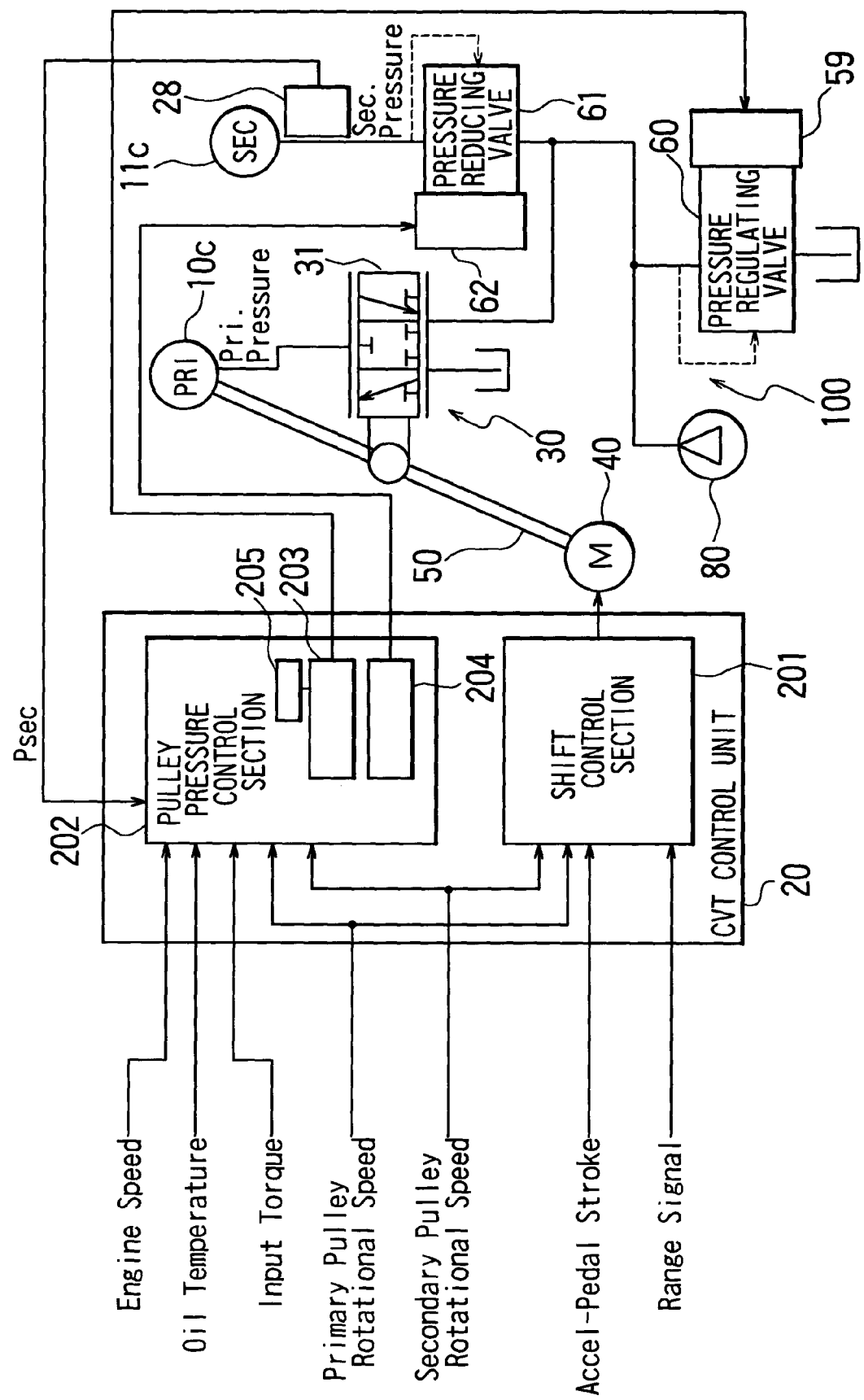
FIG. 2 is a diagram schematically showing the constructions of an oil pressure control unit and a CVT control unit.

FIG. 1 is a diagram schematically showing the construction of a belt CVT according to an embodiment of the present invention, and FIG. 2 is a diagram schematically showing the constructions of a hydraulic control unit and a CVT control unit.

In FIG. 1, a continuously variable transmission mechanism 5 is connected to an engine 1 via a torque converter 2 including a lock-up clutch and a forward-backward driving switching mechanism 4. The continuously variable transmission mechanism 5 is comprised of a pair of variable pulleys consisting of a primary pulley 10 on the input shaft side and a secondary pulley 11 connected to an output shaft 13, and the pair of variable pulleys 10 and 11 are connected to each other via a V belt 12. It should be noted that the output shaft 13 is connected to a differential gear 6 via an idler gear 14 and a drive shaft.

The gear ratio of the continuously variable transmission mechanism 5 and the contact frictional force generated by the V belt 12 are controlled by a hydraulic control unit 100, which is operable in response to instructions given from a CVT control unit 20. The CVT control unit 20 determines the gear ratio and the contact frictional force according to input torque information obtained from an engine control unit (hereinafter referred to as "ECU") 21 which controls the engine 1, the engine speed obtained from an engine speed sensor 15, and information outputted from sensors and others, described later.

The primary pulley 10 of the continuously variable transmission mechanism 5 is comprised of a fixed conical plate 10b that rotates integrally with an input shaft, and a movable conical plate 10a that is opposed to the fixed conical plate 10b to form a V-shaped pulley groove and is capable of being displaced in the axial direction according to oil pressure (hereinafter referred to as "primary pressure") applied to a primary pulley cylinder chamber 10c.

The secondary pulley 11 is comprised of a fixed conical plate 11b that rotates integrally with the output shaft 13, and a movable conical plate 11a that is opposed to the fixed conical plate 11b to form a V-shaped pulley groove and is capable of being displaced in the axial direction according to oil pressure (hereinafter referred to as "secondary pressure") applied to a secondary pulley cylinder chamber 11c.

The pressure-receiving area of the primary pulley cylinder chamber 10c is set to be greater than that of the secondary pulley cylinder chamber 11c.

The input torque inputted from the engine 1 is inputted to the continuously variable transmission mechanism 5 via the torque converter 2 and the forward-backward driving switching mechanism 4, and is transmitted from the primary pulley 10 to the secondary pulley 11 via the V belt 12. The movable conical plate 10a of the primary pulley 10 and the movable conical plate 11a of the secondary pulley 11 are displaced in the axial direction to change the radius of contact between the V belt 12 and each of the pulleys 10 and 11, so that the gear ratio between the primary pulley 10 and the secondary pulley 11 can be changed continuously.

As shown in FIG. 2, the hydraulic control unit 100 is comprised mainly of a pressure regulating valve 60 that controls the line pressure, a shift control valve 30 that controls the primary (Pri) pressure which is applied to the primary pulley cylinder chamber 10c, and a pressure reducing valve 61 that controls the secondary (Sec) pressure which is applied to the secondary pulley cylinder chamber 11c.

The shift control valve 30 is connected to a servo link 50 constituting a mechanical feedback mechanism, so that the shift control valve 30 is driven by a step motor 40 connected to one end of the servo link 50 and receives feedback of the groove width, i.e. the actual gear ratio from the movable conical plate 10a of the primary pulley 10 connected to the other end of the servo link 50.

A line pressure control system is comprised of the pressure regulating valve 60 including a solenoid 59 that regulates pressure oil supplied from an oil pump 80, so that the pressure oil is controlled to a predetermined line pressure according to the running condition in accordance with a command (e.g. a duty signal) given from the CVT control unit 20.

The line pressure is supplied to the shift control vale 30 that controls the primary pressure, and the pressure reducing valve 61 including a solenoid 62 that controls the secondary pressure.

The gear ratio between the primary pulley 10 and the secondary pulley 11 is controlled by the step motor 40 that is driven in response to a shift command signal given from the CVT control unit 20, and a spool 31 of the shift control valve 30 is driven according to the displacement of the servo link 50 moving in response to the movement of the step motor 40 to supply the primary pulley 10 with the primary pressure obtained by regulating the line pressure supplied to the shift control valve 30, so that the groove width is variably controlled to set a predetermined gear ratio.

It should be noted that the shift control valve 30 supplies and releases oil pressure to and from the primary pulley cylinder chamber 10c according to the displacement of the spool 31, and controls the primary pressure so that the target gear ratio can be achieved at a position where the step motor 40 is driven. When gear shift has been actually finished, the shift control valve 30 closes the spool 31 in response to the displacement of the servo link 50.

It should be noted that the CVT control unit 20 variably controls the gear ratio and the contact frictional force of the V belt 12 by reading signals from a primary pulley speed sensor 26 that detects the rotational speed of the primary pulley 10 of the continuously variable transmission mechanism 5, a secondary pulley speed sensor 27 that detects the rotational speed of the secondary pulley 11 (or the vehicle speed), and a secondary pressure sensor 28 that detects the secondary pressure applied to the secondary pulley cylinder chamber 11c, all of which are appearing in FIG. 1, and a range signal outputted from an inhibitor switch 23 appearing in FIG. 1, as well as the accel-pedal stroke obtained from the stroke sensor 24, and the oil temperature of the continuously variable transmission mechanism 5 detected by a temperature sensor 25 appearing in FIG. 1.

The CVT control unit 20 is comprised of a shift control section 201 that determines the target gear ratio according to the vehicle speed and the accelerator-pedal stroke and drives the step motor 40 to control the actual gear ratio to the target gear ratio, and a pulley pressure control section 202 that calculates the thrust (contact frictional force) of the primary pulley 10 and the secondary pulley 11 according to the input torque, gear ratio, oil temperature, and so forth, and converts the calculated thrust to an oil pressure.

The pulley pressure control section 202 is comprised of a line pressure control section 203 that controls the line pressure, a line pressure setting section 205 that sets the upper limit of the line pressure, and a secondary pressure control section 204 that controls the secondary pressure.

The line pressure control section 203 converts the thrust of the primary pulley 10 to an oil pressure to calculate the primary pressure, determines the target value of the line pressure according to the primary pressure, and drives the solenoid 59 of the pressure regulating valve 60, thus controlling the line pressure. The secondary pressure control section 204 converts the thrust of the secondary pulley 11 to an oil pressure, determines the target value of the secondary pressure, and drives the solenoid 62 of the pressure reducing valve 61 according to the target value of the secondary pressure and the secondary pressure detected by the oil pressure sensor 28, thus controlling the secondary pressure by feedback control (closed-loop control).

Figure 3:
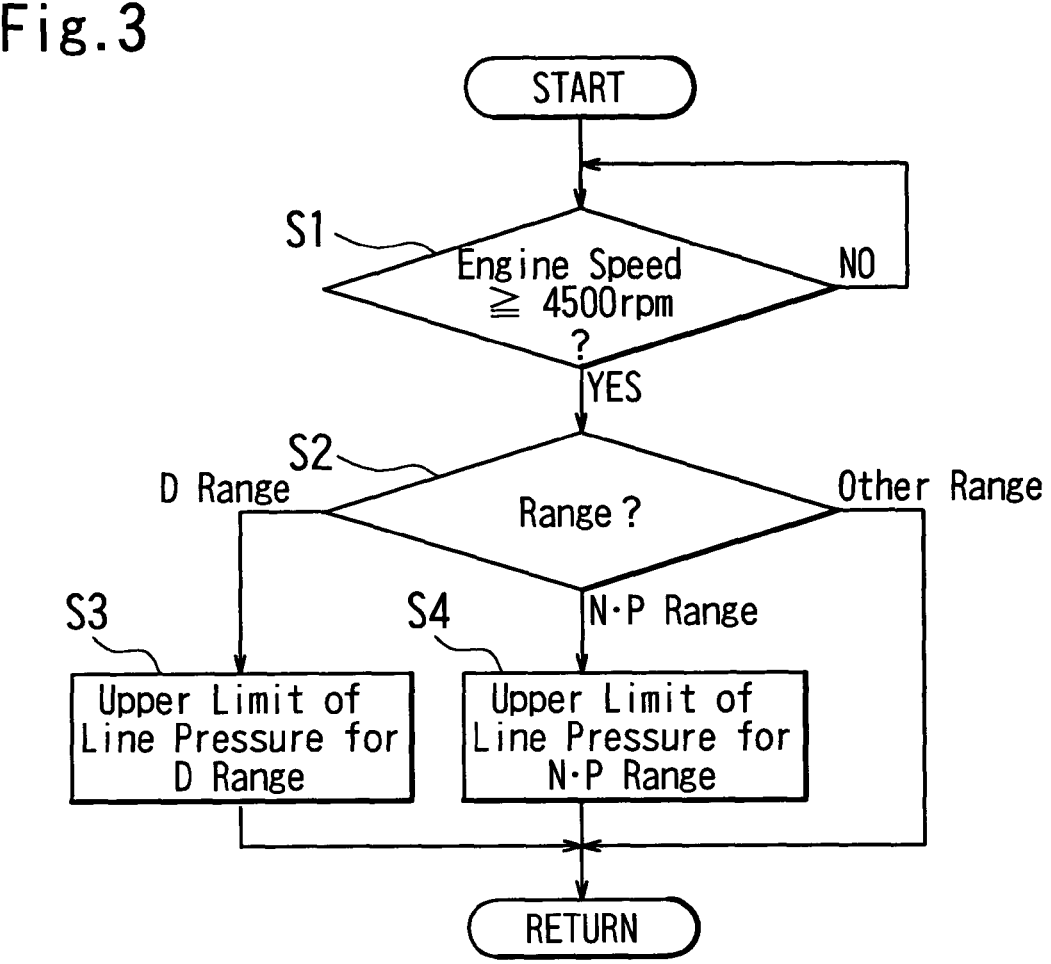
FIG. 3 is a flow chart showing an example of a line pressure upper limit setting process which is carried out by a line pressure setting section.

A description will now be given of how the upper limit of the line pressure is set by the line pressure setting section 205 with reference to a flow chart of FIG. 3.

It is assumed here that the line pressure control section 203 and the secondary pressure control section 204 constantly calculate the line pressure and the secondary pressure.

In Step S1, it is determined whether or not the engine speed inputted from the engine speed sensor 15 is equal to or greater than a preset speed 4500 rpm. If the determination result is positive, the process proceeds to Step S2. The engine speed immediately before cavitation noise starts occurring in the oil pump 80 is set as the preset speed. In the Step S2, it is determined whether a range signal inputted from the inhibitor switch 23 is indicative of a D range, an N•P range, or any other range. If it is determined that the range signal is indicative of the D range, the process proceeds to Step S3, and if it is determined that the range signal is indicative of the N•P range, the process proceeds to Step S4. If it is determined that the range signal is indicative of any other range, the process returns to the Step S1.

Figure 4:
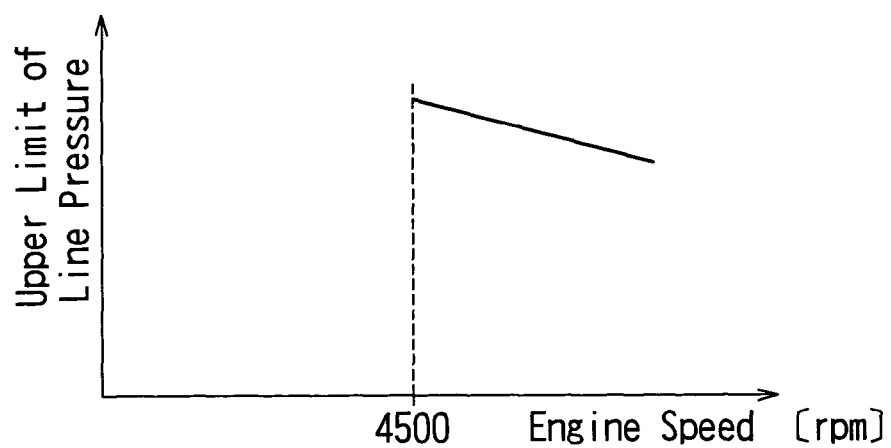
FIG. 4 is a diagram showing the relationship between the engine speed and the upper limit of line pressure.

In the Step S3, the upper limit of the line pressure is set. As shown in FIG. 4, the upper limit of the line pressure is set in a range where the engine speed is equal to or greater than 4500 rpm, such that the upper limit of the line pressure decreases as the engine speed increases.

The upper limit of the line pressure in the D range is regulated such that it never becomes smaller than the target values of the primary pressure and the secondary pressure, which are required for maintaining a predetermined gear ratio.

On the other hand, if it is determined in the Step S2 that the range signal from the inhibitor switch 23 is indicative of the N•P range, no torque is inputted to the primary pulley 10 of the continuously variable transmission mechanism 5, and hence the V belt 12 never slips. Therefore, a high oil pressure is not required for the secondary pressure, and hence the value of the line pressure can be sufficiently reduced. As a result, when the range signal is indicative of the N•P range, in the Step S4, the upper limit of line pressure can be set to be smaller than the upper limit of the line pressure set in the Step S3.

Upon completion of all the processing as above, the process returns to the Step S1, and the upper limit of the line pressure is set as described above repeatedly.

When the line pressure setting section 205 sets the upper limit of the line pressure, the line pressure control section 203 controls the line pressure such that it never exceeds the set upper limit, so that an increase in line pressure can be restricted.

In the present embodiment, the engine speed sensor 15 constitutes an engine speed detecting means of the present invention. Further, the Step S2 constitutes a range signal detecting means of the present invention, and the Steps S1, S3, and S4 constitute a line pressure upper limit setting means. Further, the line pressure control section 203 constitutes a line pressure control means, According to the above described embodiment, when the engine speed is equal to or higher than a predetermined speed, the line pressure setting section 205 sets the upper limit of the line pressure, and the line pressure control section 203 controls the line pressure such that it never exceeds the upper limit. In this way, by setting the upper limit of the line pressure and suppressing an increase in the line pressure, it is possible to suppress an increase in the rotational speed of the oil pump 80 which generates basic pressure for the line pressure. Therefore, it is possible to prevent the occurrence of cavitation noise in the oil pump 80 during high-speed engine revolution.

Further, since the upper limit of the line pressure is set according to the engine speed, the upper limit of the line pressure can be set such that it decreases as the engine speed increases. Therefore, it is possible to effectively prevent the occurrence of cavitation noise in the oil pump 80.

Further, since the upper limit of the line pressure is set according to the range signal, the upper limit of the line pressure can be set suitably for each range, and hence it is possible to more effectively prevent the occurrence of cavitation noise in the oil pump 80 according to each range.

Although in the above described embodiment, the line pressure is controlled when the signal inputted from the inhibitor switch 23 is indicative of the D range or the N•P range, the present invention is not limited to this, but the line pressure may be controlled in any other range.

Further, although in the above described embodiment, the engine speed is detected using the engine speed sensor 15, the present invention is not limited to this, but for example, the engine speed may be detected based on an engine control signal transmitted from the ECU 21.

What is claimed is:

1. A line pressure control apparatus for a continuously variable transmission, which includes a primary pulley, a secondary pulley, and a V belt entraining the first and second pulleys, and in which line pressure is generated according to a running condition and oil pressure to be applied to the primary pulley and the secondary pulley is generated from the line pressure, the apparatus comprising:
    engine speed detecting means for detecting an engine speed;
    line pressure upper limit setting means for setting an upper limit of the line pressure; and
    line pressure control means for controlling the line pressure according to the running condition,
    wherein said line pressure upper limit setting means is operable when the engine speed detected by said engine speed detecting means is equal to or higher than a predetermined speed, for setting the upper limit of the line pressure, and
    wherein said line pressure control means controls the line pressure such that the line pressure does not exceed the upper limit of the line pressure set by said line pressure upper limit setting means regardless of the line pressure generated according to the running condition.

2. A line pressure control apparatus for a continuously variable transmission according to claim 1, wherein said line pressure upper limit setting means variably sets the upper limit of the line pressure based on the engine speed detected by said engine speed detecting means.

3. A line pressure control apparatus for a continuously variable transmission according to claim 2, further comprising:
    range signal detecting means for detecting a range signal outputted from an inhibitor switch,
    wherein said line pressure upper limit setting means variably sets the upper limit of the line pressure according to the range signal detected by said range signal detecting means.

4. A line pressure control apparatus for a continuously variable transmission according to claim 1, further comprising:
    range signal detecting means for detecting a range signal outputted from an inhibitor switch,
    wherein said line pressure upper limit setting means variably sets the upper limit of the line pressure according to the range signal detected by said range signal detecting means.

5. A line pressure control apparatus for a continuously variable transmission according to claim 1, further comprising:
    range signal detecting means far detecting a range signal output from an inhibitor switch,
    wherein said line pressure upper limit setting means sets the upper limit of the line pressure at a value lower than said line pressure generated according to the running condition, when the range signal detected by said range signal detecting means is P or N range.

* * * * *